United States Patent
Finch et al.

[11] Patent Number: 6,148,347
[45] Date of Patent: *Nov. 14, 2000

[54] MODE SELECTABLE MEMORY CONTROLLER FOR PCMCIA STANDARD MEMORY CARDS AND NON-STANDARD MEMORY CARDS

[75] Inventors: Kenneth B. Finch, Sunnyvale; Eric Youngman, San Jose; Crosswell C. Collins, Oakland; Kevin J. Rowett, Cupertino, all of Calif.

[73] Assignee: Cisco Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/752,790

[22] Filed: Nov. 20, 1996

[51] Int. Cl.⁷ ........................................ G06F 3/00
[52] U.S. Cl. .................... 710/14; 710/8; 710/74
[58] Field of Search .................. 324/115; 375/8; 347/188; 711/102; 710/8, 62, 129, 14, 43, 73, 2

[56] References Cited

U.S. PATENT DOCUMENTS

| | | | |
|---|---|---|---|
| 5,142,221 | 8/1992 | Meldrum et al. | 324/115 |
| 5,202,899 | 4/1993 | Walsh | 375/8 |
| 5,537,654 | 7/1996 | Bedingfield et al. | 710/14 |
| 5,634,074 | 5/1997 | Devon et al. | 710/8 |
| 5,671,374 | 9/1997 | Postman et al. | 710/129 |
| 5,696,993 | 12/1997 | Gavish | 710/62 |
| 5,768,615 | 6/1998 | Castell et al. | 710/2 |
| 5,802,550 | 9/1998 | Fullam et al. | 711/102 |
| 5,815,191 | 9/1998 | Michielsen et al. | 347/188 |
| 5,964,850 | 10/1999 | Castell et al. | 710/14 |

*Primary Examiner*—Albert De Cady
*Assistant Examiner*—David Ton
*Attorney, Agent, or Firm*—Carr & Ferrell LLP

[57] ABSTRACT

A memory controller and system for providing access to PCMCIA standard memory cards and non-standard memory cards. Non-standard memory cards are memory cards that are compliant with PCMCIA standards for sockets and are non-compliant in other respects. The memory controller has a register for storing a code that indicates whether a memory card is a PCMCIA card or a non-standard memory card. An access control circuit in the memory controller activates and deactivates memory card control signals at times required by the memory card and as indicated by the memory card type. An acknowledge control circuit generates an acknowledge signal to a requesting processor at a time prescribed by the type of memory card.

9 Claims, 8 Drawing Sheets

Access Register 362

FIG. 6

| 7 | 6 | 5 4 3 | 2 1 0 |
|---|---|---|---|
| RESET | CARD_EN | RESERVED | MEM_SPEED |

Power Control Register 364

FIG. 7

| 7 6 | 5 4 | 3 | 2 | 1 0 |
|---|---|---|---|---|
| VPP_CTRL | VPP_STAT | VCC_EN | VCC_STAT | RESERVED |

Status Register 366

FIG. 8

| 7 6 | 5 4 | 3 2 | 1 | 0 |
|---|---|---|---|---|
| CD | BVD | VS | WP | READY |

Status Change Register 373

FIG. 9

| 7 | 6 5 4 3 2 1 0 |
|---|---|
| CD_CHANGE | RESERVED |

FIG. 10B

| Interval | Parameter | Min (ns) | Max (ns) |
|---|---|---|---|
| 1 | Address valid duration | 120 | |
| 2 | Address valid to CE[2:1]# assert | 8 | |
| 3 | CE[2:1]# assert to OE# assert | 15 | |
| 4 | Address valid to data valid | | 80 |
| 5 | CE[2:1]# assert to data valid | | 80 |
| 6 | OE# assert to data valid | | 40 |
| 7 | OE# assert to data low impedance | | 40 |
| 8 | Address invalid to CE[2:1]# deassert | −10 | 15 |
| 9 | Address invalid to OE# deassert | −6 | 10 |
| 10 | Address invalid to data invalid | 0 | |
| 11 | CE[2:1]# invalid to data invalid | 0 | |
| 12 | OE# deassert to data invalid | 0 | |
| 13 | OE# deassert to data high impedance | | 35 |

MODE SELECTABLE MEMORY CONTROLLER FOR PCMCIA STANDARD MEMORY CARDS AND NON-STANDARD MEMORY CARDS

BACKGROUND OF THE INVENTION

1. Field of the Invention

The present invention generally relates to memory controllers, and more specifically, to a memory controller that selectably controls both memory cards conforming to standards of the Personal Computer Memory Card International Association (PCMCIA cards) as well as memory cards that are compliant with PCMCIA standards for a memory card socket, but are not compliant with PCMCIA standards in other respects.

2. Description of Background Art

The PCMCIA developed an interface for credit card-sized adapters for personal computers, where the adapters were originally intended for use as memory expansion. Now, however, the popularity of the PCMCIA adapters has grown to where the standard now supports I/O devices such as fax modems and Small Computer Systems Interface (SCSI) adapters.

The 1000 Series routers from CISCO Systems have in the past used PCMCIA cards to achieve desired cost/performance objectives. The manner in which PCMCIA cards were used was as a "removable code store." That is, the PCMCIA memory card stored CPU executable program instructions which, prior to execution, were read from the PCMCIA card and stored in a faster DRAM "execution memory." The CPU would then read program instructions from the execution memory and execute the instructions.

The disadvantages of the separate removable code store and execution memory are twofold. First, there is the added cost to manufacture the system. DRAM must be built into the system for the execution memory. Second is the added complexity. The CPU must be programmed to manage storage of the program instructions in the execution memory. The additional complexity adds to engineering costs and hardware requirements.

A common objective for follow-on products is to contain or reduce costs while improving performance. However, the two objectives often compete. Performance may be improved with an increased product cost structure, or cost may be reduced with an accompanying degradation in performance.

One way to reduce costs where a PCMCIA card is used as a removable code store is to use the PCMCIA card as the execution memory. PCMCIA cards are generally commercially available, cost competitive, and standards based. However, the PCMCIA approach has a substantial adverse impact on overall performance. The performance degradation is caused by the slow memory access speeds of the PCMCIA card relative to the memory access speed of the execution memory DRAM. For some applications, the PCMCIA standard does not support a 16 bit interface that is fast enough to achieve desired performance objectives.

Two approaches to improve performance include moving to another standard, such as Cardbus, which supports 32 bit access, or designing a proprietary removable program store. The Cardbus approach presents the disadvantages of increased cost and limited availability of commercial parts, and the proprietary design presents the disadvantages of increased design and production costs and incompatibility with prior systems.

Therefore, it would be desirable to have a memory system that is cost effective and whose performance falls within desired performance parameters.

SUMMARY OF THE INVENTION

The present invention is a memory system that is operable with memory cards that are compliant with PCMCIA standards, as well as with memory cards that are compliant with PCMCIA standards for memory card sockets but are non-compliant in other respects. A memory card that is compliant with PCMCIA standards for memory card sockets but is non-compliant in other respects is referenced in this specification as a "non-standard" memory card. The memory system of the present invention has several advantages.

The present invention permits performance improvements without requiring extensive new memory designs. Use of the invention in an exemplary system, such as a router, allows usage of memory cards that are faster than PC cards without requiring a costly new memory system design. For example, a new router design may re-use prior bus and processor designs and still improve performance by using a non-standard memory card that is faster than permitted under the PCMCIA standard.

Cost savings are realized when the memory system is used in multiple different applications. Because the memory system may be used with either PC cards or non-standard memory cards, the memory system can be used in both applications that require PC cards and applications that require non-standard memory cards. Product design costs are reduced by having fewer memory system designs.

The present invention may reduce costs associated with programming and/or testing PC cards and non-standard memory cards. Because the memory system of the present invention is compatible with both PC cards and non-standard memory cards, a single system may be used for programming and/or testing both PC cards and non-standard memory cards.

The present invention has a dual-mode controller which is coupled to a PCMCIA standard socket. The dual-mode controller provides access to a memory card inserted in the socket, first by ascertaining whether the connected memory card is a standard PCMCIA card or a non-standard memory card. A memory type code is stored in a register for use by an access control circuit.

The access control circuit is coupled to the socket and to the register. Access control signals are generated by the access control circuit and transmitted to the socket. The times at which the access control circuit transmits the signals are determined according to the type of memory card. For a PCMCIA standard memory card, the control signals are generated at times defined by the standard. For a non-standard memory card, the control signals are generated at times required by the non-standard memory card.

An acknowledge control circuit is coupled to the register and transmits an acknowledgment signal to a processor which is coupled to the memory system. The time at which the acknowledge signal is transmitted is dependent upon the type of memory card. For a PCMCIA standard memory card, the acknowledgment signal is transmitted within the time limits established for the standard card. For a non-standard card, the acknowledgment signal is transmitted within time limits established for the non-standard memory card.

BRIEF DESCRIPTION OF THE DRAWINGS

FIG. 6 illustrates the format and content of the access register;

FIG. 7 illustrates the format and content of the power control register;

FIG. 8 illustrates the format and content of the status register;

FIG. 9 illustrates the format and content of the status change register; and

FIG. 10B is a table that describes the timing intervals in the timing diagram of FIG. 10A.

DETAILED DESCRIPTION

The present invention has a memory interface that may be used for both memory cards that comply with the PC Card Standard and for memory cards that operate faster than permitted by the PC Card Standard. The interface improves performance in a system having a memory card that operates faster than a PC Card Standard memory card. The interface further provides design flexibility by being compatible with PC Card Standard memory cards.

Figure 1:
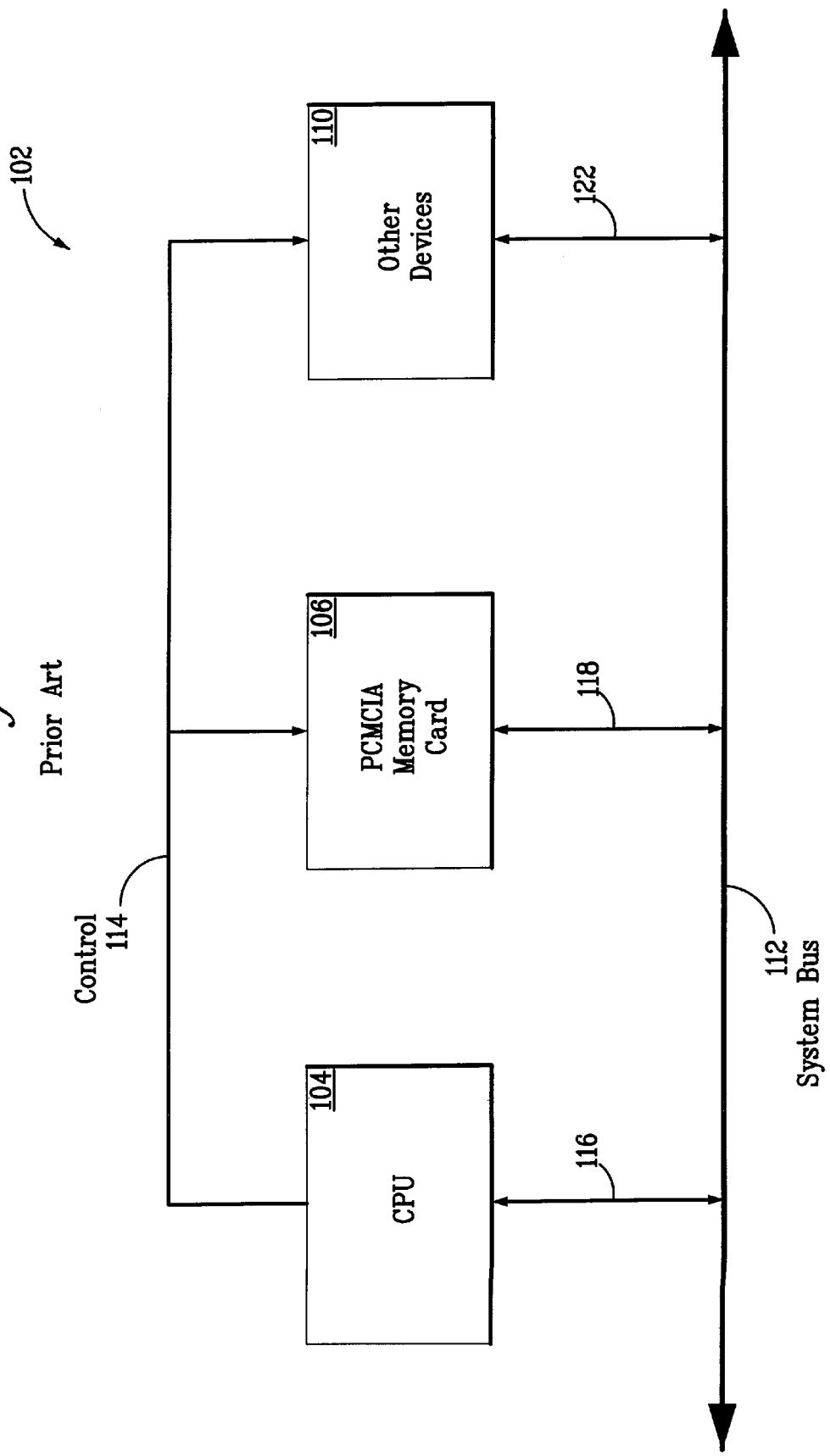
FIG. 1 is a block diagram of an exemplary prior art system in which a CPU has storage access to a PCMCIA memory card.

FIG. 1 is a block prior art system 102 in which a CPU 104 has storage access to a PCMCIA memory card 106. The system 102 includes a CPU 104, a PCMCIA memory card 106, and other storage and/or input/output devices 110. The components 104, 106, 110 are coupled by a system bus 112 having both an address bus and a data bus. The PCMCIA memory card 106 and other devices 110 are coupled to receive control signals from the CPU via control line 114. The CPU 104, PCMCIA memory card 106, and other devices 110 are respectively coupled to the system bus 112 via lines 116, 118, and 122.

The CPU 104 is a commercially available processor such as a communications or general purpose processor from Motorola Corp. or an x86 series processor from Intel Corp. The other devices 110 may include DRAMs, nonvolatile EEPROMs, and other application specific devices.

The PCMCIA memory card 106 conforms to PCMCIA standards, as set forth in the February 1995 revision of the "PC Card Standard," and is a commercially available memory card. Under the PC Card Standard, the recognized read cycle times are 600 ns, 250 ns, 200 ns, 150 ns, and 100 ns. Because some applications require the commercial advantages of PCMCIA memory cards, but also require a performance level beyond that available in PCMCIA memory cards, the PCMCIA memory card 106 is used as a code storage device, and a faster DRAM (one of the other devices 110) is used for immediate storage of code. For example, code which will eventually, but not immediately, be executed by the CPU 104 is stored in the PCMCIA memory card. However, the CPU 104 uses the DRAM for storage of the code which is soon to be executed. Thus, the CPU 104 reads blocks of code from the PCMCIA memory card 106, stores the blocks of code in the DRAM, and then uses the DRAM in its fetch and execute cycle. Because the DRAM is faster than the PCMCIA memory card 106, desired performance levels may be achieved.

Figure 2:
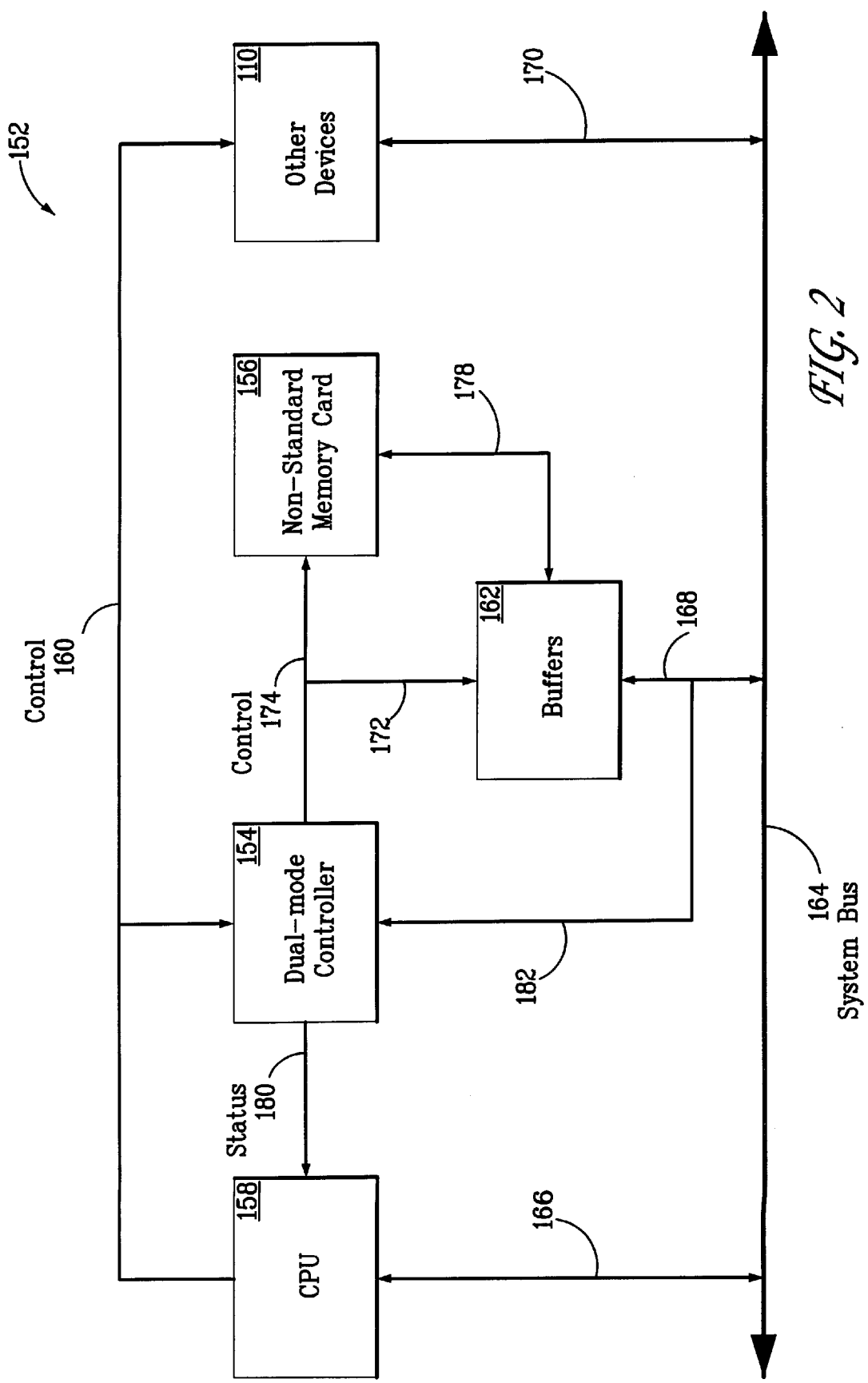
FIG. 2 is block diagram of an exemplary system in which a dual-mode controller provides access to a non-standard memory card for a CPU.

FIG. 2 is block diagram of an exemplary system 152 in which a dual-mode controller 154, which selectably provides access to either PCMCIA memory cards or to memory cards which do not conform to the PC Card Standard, provides access to a non-standard memory card 156 for a CPU 158. The dual-mode controller 154 and other devices 110 are coupled to receive control signals on line 160 from CPU 158. Buffers 162 are used by the dual-mode controller 154 to isolate the memory card 156 from the system bus 164. The CPU 158, buffers 162 and other devices 110 are respectively coupled to the system bus 164 via lines 166, 168, and 170. The system bus 164 includes both an address bus and a data bus.

In response to control signals from CPU 158 for access to the non-standard memory card 156, dual-mode controller 154 activates control signals at appropriate timing intervals on line 172 to buffers 162 and on line 174 to the memory card 156. Under control of the dual-mode controller 154, the buffers 162 latch an address from line 168. The address is then routed to the memory card 156 via line 178. For a read operation, the memory card 156 reads the addressed data which is then returned to buffers 162 via line 178. Dual-mode controller 154 enables storage of the data in buffers 162 and signals completion of the operation to CPU 158 via status line 180.

The dual-mode controller 154 has internal registers (not shown) that are configurable by CPU 158. The operational mode of the dual-mode controller 154 is selectable by the CPU 158 by way of information in the internal registers. The dual-mode controller is coupled to the system bus 164 via line 182.

The dual-mode controller 154 supports read/write access as defined in the PC Card Standard for 150ns, 200 ns, or 250 ns memory cards. In addition, the dual-mode controller supports a read operation whose timing is faster than those permitted in the PC Card Standard. The CPU 158 of the exemplary system 152 is a Motorola MC68EN360 QUICC communications processor.

An exemplary non-standard memory card 156 is a fast flash memory which is commercially available from either Smart Modular or Amp, Inc. The fast flash memory device (not shown) within such a non-standard memory card 156 may be an Intel 28F016-70 device or an AMD 29F016-70 device. In today's technology, fast flash memory is desirable. However, those skilled in the art will recognize that other types of memory may be suitable for various applications. The remainder of the specification assumes that the non-standard memory card 156 has fast flash memory which has a read access time that is faster than permitted under the PC Card Standard, and therefore, is a non-standard memory card.

A non-standard memory card 156 having fast flash memory is fast enough to support usage as an execution memory, and the dual-mode controller 154 provides access to the non-standard memory card at speeds supported by the fast flash memory. The dual-mode nature of the dual-mode controller 154 provides the user with flexibility in selecting either a memory card that is compliant with the PC Card Standard, or a non-standard memory card 156. In addition, the dual-mode controller allows use of a single device to program and/or test both standard PC Cards and non-standard memory cards.

In addition to being faster than a PC Card, the non-standard memory card 156 does not provide odd-byte access as set forth in the PC Card Standard, thereby enhancing performance by eliminating a layer of logic in the memory. The form factor and pin lengths of the non-standard memory card 156 comply with the PC Card Standard for Type I or Type II cards. The card-side connector of the non-standard memory card 156 is a Cardbus style connector in that it uses the additional grounding offered by a CPU-side Cardbus style connector that has a ground shroud. The Cardbus style connector is described in the PC Card Standard. The card-side connector is also compatible with standard 16-bit CPU-side connectors.

Figure 3:
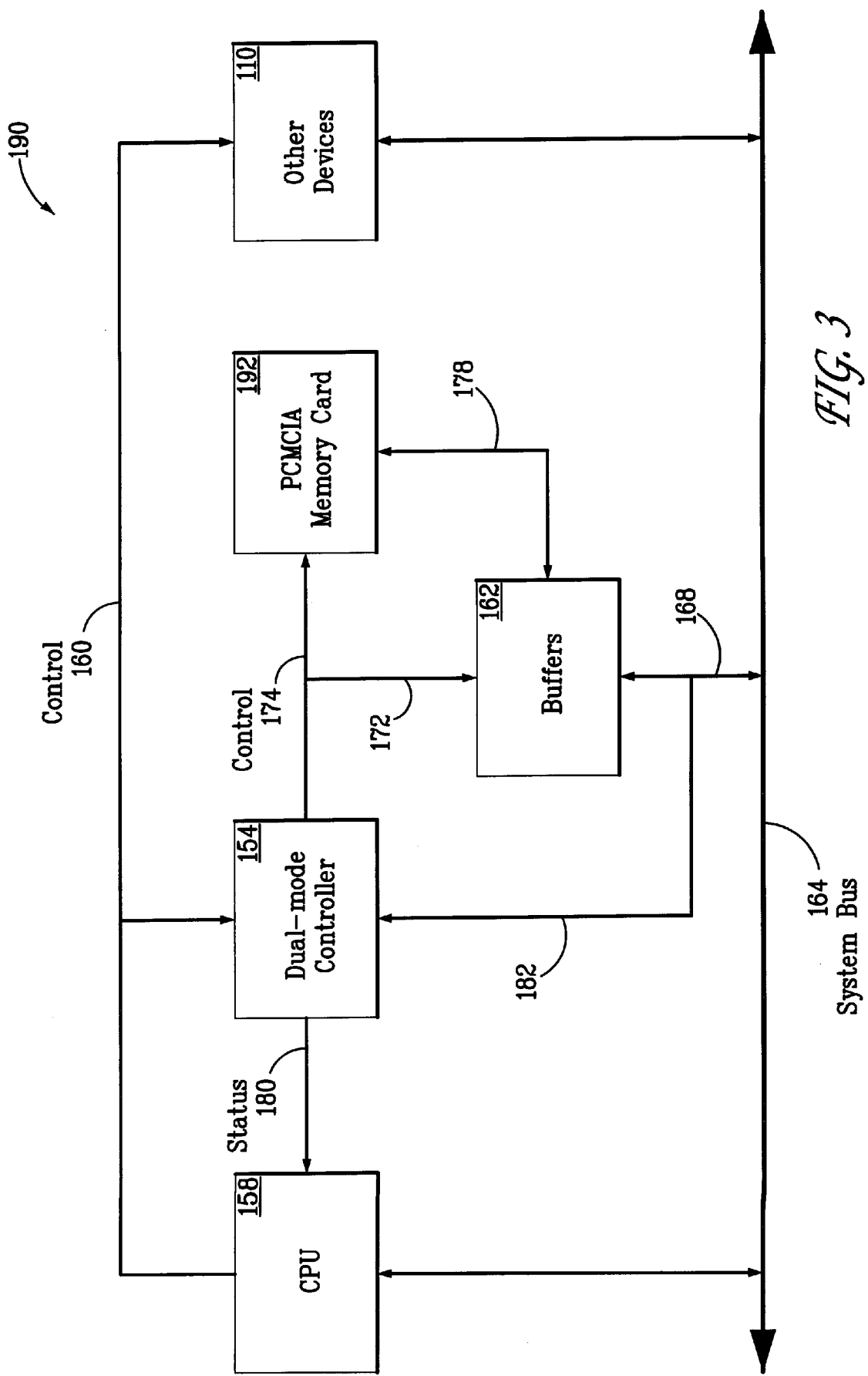
FIG. 3 is a block diagram of an exemplary system in which the dual-mode controller provides access to PCMCIA memory card for a CPU.

FIG. 3 is a block diagram of an exemplary system 190 in which the dual-mode controller 154 provides access to PCMCIA memory card 192 for a CPU 158. Note that the PCMCIA memory 192 has been substituted for the non-standard memory card 156 of FIG. 2. The PCMCIA memory is a device that complies with the requirements set forth in the PC Card Standard.

To provide access to the PCMCIA memory 192, the internal registers (not shown) of the dual-mode controller 154 are configured with control codes which indicate that the memory 192 complies with the PC Card Standard. In response to the control codes, the dual-mode controller activates control signals on lines 172 and 180 at timing intervals dictated by the standard.

Figure 4:
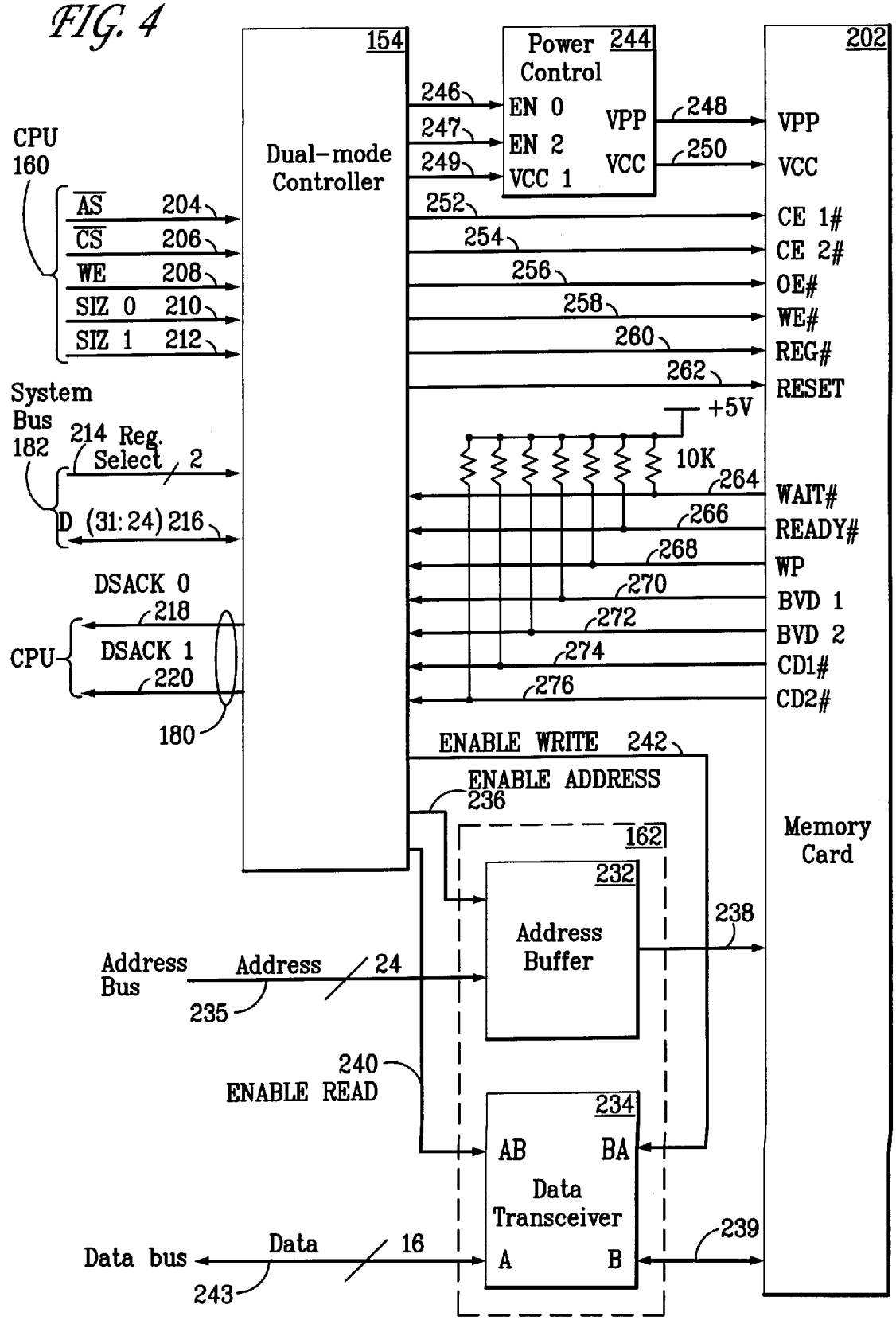
FIG. 4 is a block diagram of the address, data, control, and status signals that couple the dual-mode controller, the buffers, and a memory card.

FIG. 4 is a block diagram of the address, data, control, and status signals that couple the dual-mode controller 154, the buffers 162, and a memory card 202. The memory card 202 is illustrative of either the non-standard memory card 156 or the PCMCIA memory card 192.

The dual-mode controller 154 is implemented using an Altera MAX 7000-class EPLD/MPLD. The dual-mode controller is programmed to selectably provide access to either a non-standard memory card 156 or a PCMCIA standard memory card 192.

From the CPU 158, the dual-mode controller 154 receives an address strobe (AS) signal on line 204, a chip select (CS) signal on line 206, a write enable (WE) signal on line 208, size signals (SIZ0, SIZ1) on lines 210 and 212, and register select signals on line 214. Data signals for bits 24–31 are received from and sent to the system bus 164 on line 216. Data acknowledgment signals (DSACK0, DSACK1) are returned to the CPU 156 via lines 218, 220. DSACK0 acknowledges an 8 bit bus cycle, and DSACK1 acknowledges a 16 bit bus cycle.

The address strobe signal on line 204 signals the availability of an address on the system bus 164; the chip select signal on line 206 selects the device on the bus 164 to receive the address; the write enable signal on line 208 indicates a write operation, either to the internal registers (not shown) of the dual-mode controller or to the memory card 202; and the SIZ0 and SIZ1 signals on lines 210, 212 indicate the size of the access. The DSACK0 and DSACK1 signals on lines 220 indicate to the CPU 156 the availability of data on the system bus 164.

The register select signals on line 214 are used by the CPU 158 to select from internal registers (not shown) of the dual-mode controller 154 to configure the dual-mode controller. The dual-mode controller 154 is configured by the CPU 158 to provide access to either a non-standard memory card 156 or a PCMCIA memory 192. The two register select bits are actually address bits that are input from the system bus 164. Line 216 connects to the system bus 164 and is used for reading data from and writing data to registers in the dual-mode controller.

The buffer element 162 includes an address buffer 232 and a data transceiver 234. The address buffer is coupled to the system bus 164 via address line 235 to receive an address from the CPU 158. Storage of the address in the buffer 232 is enabled by the dual-mode controller 154 by the enable address signal on line 236. The address is input to the memory card 202 via line 238.

The data transceiver 234 supports bi-directional data flow between the system bus 164 and memory card 202, and is used to isolate the memory card from the system bus to ensure adequate data hold times during writes to the memory card. The data transceiver 234 is coupled to the memory card 202 via signal line 239. Enable read and enable write signals on lines 240 and 242 from the dual-mode controller 154 control the storage of data in the data transceiver 234. The data transceiver 234 is coupled to the data bus via line 243.

Power control circuit 244 controls the voltage applied to the sockets that receive the memory card 202. Signals received on ports EN0 and EN1 control the voltage applied to the VPP input port of the memory card 202. The dual mode controller 154 supplies control signals on lines 246 and 247 to the respective input ports EN0 and EN1, and the power control circuit 244 supplies the programming voltage via line 248 to the VPP port. The voltage supply VPP can be 0, 5, or 12 volts DC.

The signal received via line 249 at the input port VCC1 controls the VCC input port of the memory card 202. The voltage supply VCC can be 0 or 5 volts DC. The voltage supply VCC is supplied on line 250 to the memory card 202.

Figure 10A:
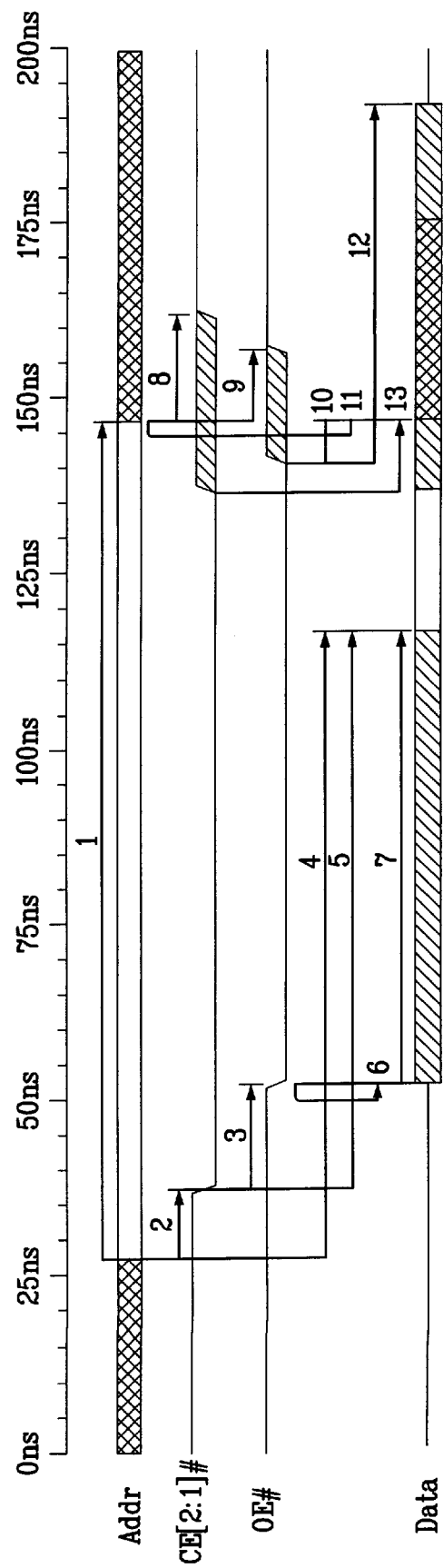
FIG. 10A is a timing diagram for the non-standard memory card.

The dual-mode controller 154 generates control signals whose relative timing depends on the type of memory card 202, where the type is either a non-standard memory card 156 or a PCMCIA memory 192. The control signals include card enable signals (CE1, CE2) on lines 252 and 254, output enable signal (OE) on line 256, write enable signal (WE) on line 258, the REG signal on line 260, and the reset signal on line 262. Functionally, the signals CE1, CE2, OE, WE, REG, and RESET operate according to the definitions set forth in the PC Card Standard; however, their relative timings vary according to the type of memory card 202. FIGS. 10A and 10B show the deviations from the standard timings.

The WAIT signal on line 264, READY signal on line 266, write protect signal (WP) on signal line 268, battery voltage detect signals (BVD1 and BVD2) on lines 270 and 272, and the card detect signals (CD1, CD2) on lines 274 and 276 function according to the PC Card Standard.

Figure 5:
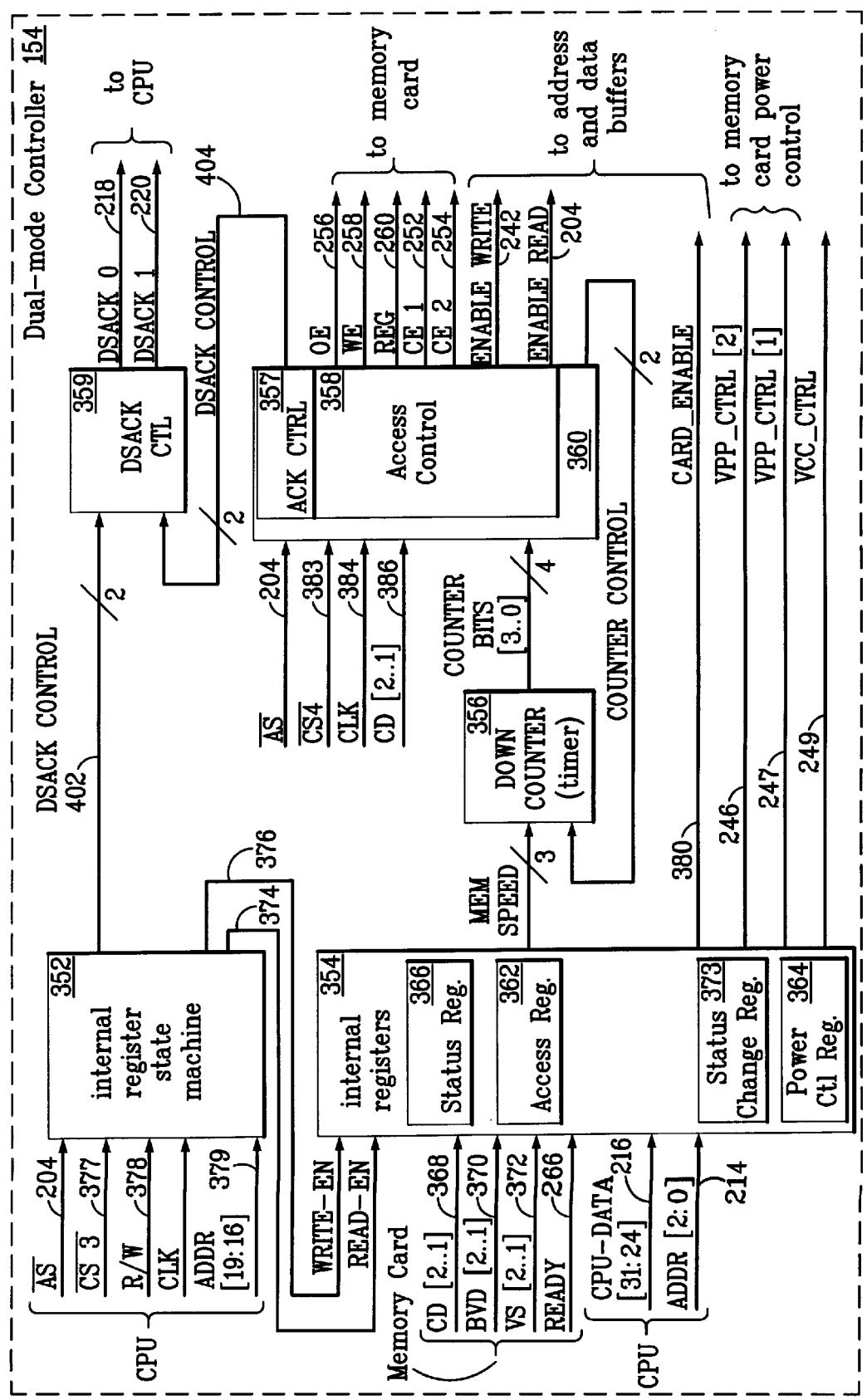
FIG. 5 is a functional block diagram of the dual-mode controller.

FIG. 5 is a functional block diagram of the dual-mode controller 154. The controller 154 includes an internal register state machine 352 for controlling internal registers 354, a counter 356, an acknowledge control circuit 357, and an access control circuit 358 for generating control signals at timing intervals according to the type of memory card 202. The DSACK control element 359 generates acknowledge signals that are carried on lines 218 and 220 to the CPU 158. The acknowledge control circuit 357 and access control circuit 358 are circuits that operate under the control of the memory card transfer state machine 360.

Before any access is made to the memory card 202, the controller 154 is configured to control the particular type of memory card 202 to which the controller will provide access. Control codes are stored in the access register 362 to establish parameters for the timing of control signals to the memory card 202, and control codes are stored in the power control register 364 to control power to the memory card. The CPU 158 sends register select bits on line 214 to select a register, and the data to be stored in a register is input on line 216. The CPU 158 obtains memory type information from a control information structure stored in the memory card 202. The control information structure is described in the PC Card Standard.

The status register 366 receives inputs on lines 266, 368, 370, and 372. Line 368, carrying the CD[2..1] signal, corresponds to lines 274 and 276 of FIG. 4; line 370 carrying the BVD[2..1] signal corresponds to lines 270 and 272 of FIG. 4; and line 372 carries the voltage select signals (VS[2..1]) from the memory card. The status change register 373 is responsive to a change in the card detect signals on line 368.

Reading from the registers 362, 364, 366, 373 is enabled by the read enable signal on line 374, and writing to the registers is enabled by the write enable signal on line 376. The internal register state machine 352 selectively activates the write enable signal and read enable signal in response to the chip select signal (CS3) on line 377, the read/write signal on line 378, and address bits [19:16] on line 379.

The buffers 162 from FIG. 4 are enabled by the dual-mode controller 154 with the CARD_ENABLE signal on line 380. The dual-mode controller 154 initializes the power control of the memory card 202 with the programming voltage control signals (VPP_CTRL[2..1]) on lines 246 and 247 and supply voltage control signal (VCC_CTRL) on line 249. The programming voltage control signals on lines 246 and 247 and the supply voltage control signal on line 249 are dependent on the control code established by the CPU 158 in the power control register 364.

A read access to the memory card 202 begins with the assertion of the address strobe signal on line 204 and the chip select signal (CS4) on line 383. The clock signal (CLK) on line 384 is input from the CPU 158, and the card detect signals (CD[2..1]) are input to the transfer state machine 360 on line 386. The access control circuit 358 asserts card enable signals (CE1 and CE2) on lines 252 and 254 to the memory card 202. Then the output enable signal (OE) on line 256 to the memory card and the read enable signal on line 204 are also asserted. The memory card transfer state machine 360 then loads the down counter 356 with the memory speed bits from the access register 362. After the memory speed bits are loaded, the counter is enabled to count down until it reaches zero. After the down counter 356 reaches zero, the acknowledge control circuit 357 initiates control signals to assert the DSACK1 signal on line 220 and proceeds with the signal sequences necessary to terminate the access cycle. The DSACK1 signal indicates to the CPU 158 that the requested data is available on the system bus 164. The down counter 356 thereby controls the duration of the signals to the socket by way of the value loaded into the down counter at the start of the cycle.

The DSACK0 and DSACK1 signals on lines 218 and 220 are respectively controlled by the internal register state machine 352 and the acknowledge control circuit 357. Both the internal register state machine 352 and the acknowledge control circuit 357 generate a first signal to output enable both DSACK signals on lines 218 and 220, and a second signal to assert one of signals DSACK0 and DSACK1 on respective lines 218 and 220. Line 402 shows the two signals from the internal register state machine 352, and Line 404 shows the two signals from the acknowledge control circuit 357.

During an access cycle to the internal registers 354, the internal register state machine 352 output enables both DSACK0 and DSACK1 on line 218 and 220. When the data transfer is complete, the DSACK0 signal on line 218 is asserted to acknowledge completion of an 8 bit transfer, then the outputs of DSACK control circuit 359 are returned to a high impedance state to end the bus cycle. Similarly, during an access cycle to the memory card 202, the outputs of the DSACK control circuit 359 are enabled. When the transfer of data from the memory card is complete, the DSACK1 signal on line 220 is asserted to acknowledge a 16 bit data transfer.

FIG. 6 illustrates the format and content of the access register 362. Bits in the access register 362 indicate the state of various operational parameters of the memory card 202. The bits and their usage are as follows:

| Bit Name | Access | Def. | Usage |
| --- | --- | --- | --- |
| RESET | r/w | 0: | Deassert socket reset signal. |
| | | 1: | Assert socket reset signal. |
| CARD_EN | r/w | 0: | Tri-state all outputs from the socket to the memory card |
| | | 1: | Enable all outputs from socket to the memory card |
| MEM_SPFED [2 . . . 0] | r/w | 000: | Set Common Memory accesses to "proprietary mode" |
| | | 001: | Set Common Memory accesses to 100ns |
| | | 010: | Set Common Memory accesses to 150ns |
| | | 011: | Set Common Memory accesses to 200ns |
| | | 100: | Set Common Memory accesses to 250ns |
| | | 101: | Set Common Memory accesses to 250ns |
| | | 110: | Set Common Memory accesses to 250ns |
| | | 111: | Set Common Memory accesses to 250ns |

Note:
CARD_EN will also reset to 0 when the socket's CD[2 . . . 1] pins change state from [0,0] to anything else.

FIG. 7 illustrates the format and content of the power control register 364. The bits in the power control register 364 indicate the control parameters for powering the memory card 202. The bits and their usage are as follows:

| Bit Name | Access | Def. | Usage |
| --- | --- | --- | --- |
| VPP_CTRL'. . . 0] | r/w | 00: | Set memory card VPP '. . . 1] pins to 0 VDC |
| | | 01: | Set memory card VPP '. . . 1] pins to +5 VDC |
| | | 10: | Set memory card VPP '. . . 1] pins to +12 VDC |
| | | 11: | Set memory card VPP '. . . 1] pins to 0 VDC |
| VPP_STAT'. . . 0] | r | 00 | Memory card VPP '. . . 1] pins are 0 VDC |
| | | 01: | Memory card VPP '. . . 1] pins are +5 VDC |
| | | 10: | Memory card VPP '. . . 1] pins are +12 VDC |
| | | 11: | Memory card YPP '. . . 1] pins are 0 VDC |
| VCC_EN | r/w | 0 | Set memory card VCC pins to 0 VDC |
| | | 1 | Set memory card VCC pins to +5 VDC |
| VCC_STAT | r | 0 | Memory card VCC pins are 0 VDC |
| | | 1 | Memory card VCC pins are +5 VDC |

FIG. 8 illustrates the format and content of the status register 366. Bits in the status register 366 indicate whether a memory card 202 is inserted in the socket and the state of various operational parameters of the memory card. The bits and their usage are as follows:

| Bit Name | Access | Def. | Usage |
|---|---|---|---|
| CD[2...1] | r | 00: | Card is fully inserted in socket |
|  |  | 01: | Card is partially inserted in socket |
|  |  | 10: | Card is partially inserted in socket |
|  |  | 11: | Card is partially inserted, or missing |
| BVD[2..1] | r | 00: | Card data is lost |
|  |  | 01: | Battery low warning |
|  |  | 10: | Card data is lost |
|  |  | 11: | Battery and data OK |
| VS[2...1] | r | 00: | Card is capable of +5 VDC VCC operation |
|  |  | 01: | Invalid |
|  |  | 10: | Card is capable of +5 VDC VCC operation |
|  |  | 11: | Card is capable of +5 VDC VCC operation |
| WP | r | 0: | Card is not write-protected |
|  |  | 1: | Card is write-protected |
| READY | r | 0: | Card is not ready |
|  |  | 1: | Card is ready |

FIG. 9 illustrates the format and content of the status change register 373. A bit in the status change register 373 indicates a change in status of the memory card 202. The bit and its usage are as follows:

| Bit Name | Access | Def. | Usage |
|---|---|---|---|
| CD_CHANGE | r | 0: | no change in card detection status |
|  |  | 1: | change in card detection status |

Note:
register value will reset to 0 after each read.

FIG. 10A is a timing diagram for the non-standard memory card 156 having fast flash memory, and FIG. 10B is a table that describes the timing intervals in the timing diagram of FIG. 10A. Because the application in which the invention is embodied only requires read access to the non-standard memory card 156, the dual-mode controller does not support write access to the memory. However, write access is supported for PCMCIA memories 192, and those skilled in the art will recognize that the dual-mode controller could be enhanced to provide write access to the non-standard memory card 156.

Interval 1 of FIG. 10B shows the duration during which a valid address is available on the system bus 164. For the non-standard memory card 156, the duration is a minimum of 120 ns. Note that for a PCMCIA memory 192, the PC Card Standard defines the required duration.

The duration of interval 2 is a minimum of 8 ns and is measured from the time at which an address becomes valid on the bus 164 to the time that the card enable signals (CE[2..1]) on lines 252 and 254 are activated. Timing interval 3 is the duration between activation of the card enable signals and activation of the output enable signal (OE#) on line 256. Interval 3 is a minimum 15 ns.

Interval 4 has a duration that extends from the appearance of a valid address on the system bus 164 to the availability of data from the non-standard memory card 156. The maximum duration of interval 4 is 80 ns. The end of interval 4 is when the dual-mode controller 154 transmits an acknowledge signal on line 180 to a processor 158. The duration of interval 5 is also a maximum of 80 ns and is measured from the activation of the card enable signals on lines 252 and the availability of data from the non-standard memory card 156. Interval 6 has a maximum duration of 40 ns as measured from assertion of the OE# signal on line 256 to the time at which the data is valid on the system bus 164.

The duration of interval 7 is a maximum of 40 ns. The duration of interval 7 is measured from the time at which the OE# signal on line 256 is asserted to time at which the data signals on line 239 from the memory card 202 are no longer in a state of high impedance, or that the data signals are being actively driven by the memory card.

Interval 8 has a duration that extends from the time at which an address becomes invalid to the time at which the card enable signals (CE[2:1]) on lines 252 and 254 are deasserted. The duration ranges between −10 ns to 15 ns. The negative minimum duration indicates that the card enable signals on lines 252 and 254 can be deasserted as much as 10 ns before the address becomes invalid.

The duration between the time at which the address becomes invalid and the time at which the output enable signal (OE#) on line 256 is deasserted is shown by interval 9. The duration of interval 9 ranges from a minimum of −6 ns to a maximum of 10 ns. The output enable signal on line 256 can be deasserted up to 6 ns before the address becomes invalid.

Interval 10 is the duration from the time at which the address on signal line 238 becomes invalid and the time at which the data on line 239 from the memory card 202 becomes invalid. The minimum duration of 0 ns indicates that the data signals may become invalid at the same time as, or after, the address signals become invalid.

The duration that extends from the time at which the card enable signals (CE[2:1]) on lines 252, 254 are deasserted to the time at which the data from the memory card 202 becomes invalid on line 239 is shown as interval 11. Interval 11 has a minimum duration of 0 ns which indicates that the data signals may become invalid at the same time as, or after, the card enable signals are deasserted.

Interval 12 has a duration that extends from time at which the output enable (OE#) on line 256 is deasserted to the time at which the data from the memory card 202 becomes invalid on line 239. The minimum duration of 0 ns indicates that the data signals may become invalid at the same time as, or after, the output enable signal is deasserted.

The last interval described is interval 13. Interval 13 has a duration that extends from the time at which the output enable (OE#) on line 256 is deasserted to the time at which the memory card 202 forces its data output port (coupled to data line 239) to a state of high impedance. The maximum duration of interval 11 is 35 ns.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A mode-selectable memory system for standard PCMCIA memory cards and non-standard memory cards that are PCMCIA socket compatible, comprising:

a PCMCIA compatible socket for connecting a memory card;

a register for storing a code indicative of a type of a memory card connected to the socket, the type being either a PCMCIA standard memory card or a non-standard memory card;

an address buffer coupled to the socket and to a system bus for receiving an address from a processor and sending the address to the memory card;

an access control circuit, coupled to the register and to the socket, that generates and transmits access control signals to the memory card at times governed by the code stored in the register, the access control circuit having an enable-read output terminal; and a data transceiver having an enable read input terminal coupled to the enable-read output terminal of the access control circuit to receive an enable-read signal for enable the data transceiver to store data read from the memory card.

2. The system of claim 1, further comprising an acknowledge control circuit coupled to the register for transmitting an acknowledge signal to a processor at a time governed by the code in the register, thereby signaling availability of data read from the memory card.

3. The system of claim 1, further comprising:

the access control circuit having an enable-write output terminal; and the data transceiver having an enable-write input terminal coupled to the enable-write output terminal of the access control circuit to receive an enable-write signal for enabling the data transceiver to output data to the memory card.

4. The system of claim 1, further comprising a non-standard memory card inserted in the socket.

5. A mode-selectable memory system for reading standard PCMCIA memory cards and non-standard memory cards that are PCMCIA socket compatible, comprising:

a PCMCIA compatible socket for connecting a memory card;

a non-standard memory card inserted in the socket;

a processor coupled to the socket for reading a code indicative of a type of a memory card inserted in the socket, the type being either a PCMCIA standard memory card or a non-standard memory card;

a register coupled to the processor for storing the code;

an address buffer coupled to the socket and to a system bus for receiving an address from the processor and sending the address to the memory card;

an access control circuit, coupled to the register and to the socket, that generates and transmits access control signals to the memory card at times governed by the code stored in the register; and a data transceiver coupled to the access control circuit to receive an enable signal, coupled to the processor to send and receive data, and coupled to the memory card to send and receive data.

6. The system of claim 5, further comprising an acknowledge control circuit coupled to the register and to the processor that transmits an acknowledge signal to the processor at a time governed by the code in the register, thereby signaling availability of data read from the memory card.

7. The system of claim 5, further comprising:

the access control circuit having an enable-read output terminal; and the data transceiver having an enable read input terminal coupled to the enable-read output terminal of the access control circuit to receive an enable-read signal for enabling the data transceiver to store data from the memory card.

8. The system of claim 7, further comprising:

the access control circuit having an enable-write output terminal; and the data transceiver having an enable-write input terminal coupled to the enable-write output terminal of the access control circuit to receive an enable-write signal for enabling the data transceiver to output data to the memory card.

9. A method for providing access for a processor to a memory card in a PCMCIA standard socket, comprising the steps of;

receiving a memory type code at a memory controller, the memory type code being indicative of a PCMCIA memory card or a non-standard memory card;

transmitting access control signals to the memory card and to an address buffer, which is coupled to both a system bus and the PCMCIA socket, at times required by a PCMCIA memory card if the memory type code indicates a PCMCIA memory card or at times required by the non-standard memory card if the memory type code indicates a non-standard memory card;

receiving a memory address from the address buffer in response to the access control signals;

transmitting an acknowledge signal to the processor at a time required by a PCMCIA memory card if the memory type code indicates a PCMCIA memory card; and transmitting an acknowledge signal to the processor at a time required by a non-standard memory card if the memory type code indicates a non-standard memory card.

* * * * *

UNITED STATES PATENT AND TRADEMARK OFFICE
CERTIFICATE OF CORRECTION

PATENT NO.   : 6,148,347
DATED        : November 14, 2000
INVENTOR(S)  : Kenneth B. Finch, Eric Youngman, Crosswell C. Collins, Kevin J. Rowett It is certified that error appears in the above-identified patent and that said Letters Patent is hereby corrected as shown below:

Title page,
In the title before "MODE" insert -- A --.

Column 1,
Line 1, before "MODE" insert -- A --.

Column 8,
Line 20, replace "SPFED" with -- SPEED --.
Line 21, replace "[2...0]" with -- [2..0] --.
Line 28, replace "CD[2...1]" with -- CD[2..1] --.
Line 29, replace "[0.0]" with -- [0,0] --.
Line 39, replace "VPP_CTRL'...0]" with -- VPP_CTRL[1..0] --.
Lines 39, 42, 45, 47, 49, 51, 53 and 55, replace "VPP'...1]" with -- VPP[2..1] --.
Line 49, replace "VPP_STAT' ...0]" with -- VPP_STAT[1..0] --.

Column 9,
Line 7, replace "CD[2...1]" with CD[2..1] --.
Line 13, repalce "VS[2...1]" with -- VS[2..1] --.
Line 57, replace "(CE[2..1]" with -- (CE[2:1] --.

Column 11,
Line 12, replace "enable" with -- enabling --.

Column 12,
Line 26, replace ";" with -- : --.

Signed and Sealed this

Twenty-sixth Day of February, 2002

*Attest:*

*Attesting Officer*

JAMES E. ROGAN
*Director of the United States Patent and Trademark Office*